US012109798B2

(12) United States Patent
Ishida et al.

(10) Patent No.: US 12,109,798 B2
(45) Date of Patent: Oct. 8, 2024

(54) RECORDING APPARATUS AND CONVEYANCE APPARATUS

(71) Applicant: CANON KABUSHIKI KAISHA, Tokyo (JP)

(72) Inventors: Takaaki Ishida, Kanagawa (JP); Masakazu Tsukuda, Kanagawa (JP); Masaaki Matsuura, Kanagawa (JP); Koki Kudo, Kanagawa (JP); Akira Kida, Kanagawa (JP); Masashi Hayashi, Kanagawa (JP); Atsushi Arai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 115 days.

(21) Appl. No.: 17/852,185

(22) Filed: Jun. 28, 2022

(65) Prior Publication Data

US 2022/0410591 A1 Dec. 29, 2022

(30) Foreign Application Priority Data

Jun. 29, 2021 (JP) ................................ 2021-108169

(51) Int. Cl.

| | |
|---|---|
| ***B41J 3/60*** | (2006.01) |
| ***B41J 11/00*** | (2006.01) |
| ***G03G 15/00*** | (2006.01) |

(52) U.S. Cl.

CPC ...... *B41J 11/0015* (2013.01); *G03G 15/6529* (2013.01); *B65H 2301/5133* (2013.01)

(58) Field of Classification Search

CPC ..... B41J 11/0015; B41J 3/60; G03G 15/6529; G03G 15/234; G03G 15/235; B65H 2301/5133

See application file for complete search history.

(56) References Cited

U.S. PATENT DOCUMENTS

2016/0243854 A1* 8/2016 Chiba .................... B41J 11/007

FOREIGN PATENT DOCUMENTS

| | | |
|---|---|---|
| JP | 2004010240 A | 1/2004 |
| JP | 2021196398 A | * 12/2021 |

OTHER PUBLICATIONS

Watanabe, Machine TranslationofJP-2021196398-A, 2021 (Year: 2021).*

* cited by examiner

*Primary Examiner* — Scott A Richmond
(74) *Attorney, Agent, or Firm* — Canon U.S.A., Inc. IP Division

(57) ABSTRACT

A recording apparatus includes a conveyance unit, a conveyance path, a double-sided conveyance path, and first and second charge eliminators. The conveyance unit conveys a recording medium having first and second surfaces in a first direction through the conveyance path to a recording area where recording is performed by a recording unit on the first surface. The recording medium then passes through the double-sided conveyance path before recording is performed on the second surface. The first charge eliminator eliminates charges from the first surface and is disposed at a position downstream of a junction between the conveyance path and the double-sided conveyance path in the first direction and upstream of the recording area in the first direction. The second charge eliminator eliminate charges from the second surface and is disposed downstream of the junction in the first direction and upstream of the recording area in the first direction.

9 Claims, 11 Drawing Sheets

RECORDING APPARATUS AND CONVEYANCE APPARATUS

BACKGROUND

Field

The present disclosure relates to a recording apparatus and a conveyance apparatus each including a charge eliminating unit that eliminates charges from a medium.

Description of the Related Art

There is known a recording apparatus having a charge eliminating unit for eliminating charges from a conveyed recording medium. For example, Japanese Patent Application Laid-Open No. 2004-10240 discusses the following configuration. A sheet as the recording medium is sent out downstream by a sheet discharge roller pair. A first charge eliminator and a second charge eliminator are disposed near and downstream of the sheet discharge roller pair to eliminate charges from the sheet.

In the configuration of Japanese Patent Application Laid-Open No. 2004-10240, however, the charge eliminators are disposed only for one surface of the recording medium.

For this reason, there is an issue that charges are eliminated from only the surface of the recording medium for which the charge eliminators are disposed, and charges are not sufficiently eliminated from the other surface.

SUMMARY

The present disclosure is directed to eliminating charges from both surfaces of a recording medium.

According to an aspect of the present disclosure, a recording apparatus includes a conveyance unit configured to convey a recording medium in a first direction to a recording area where recording is to be performed by a recording unit, a storage unit configured to store the recording medium, a conveyance path through which the recording medium passes in a case where the recording medium is conveyed from the storage unit to the recording area by the conveyance unit, a double-sided conveyance path through which the recording medium passes after recording is performed on a first surface of the recording medium by the recording unit and before recording is performed on a second surface of the recording medium by the recording unit, a first charge eliminator disposed at a position downstream of a junction between the conveyance path and the double-sided conveyance path in the first direction and upstream of the recording area in the first direction and configured to eliminate charges from the first surface of the recording medium, and a second charge eliminator disposed at a position downstream of the junction in the first direction and upstream of the recording area in the first direction and configured to eliminate charges from the second surface of the recording medium.

Further features of the present disclosure will become apparent from the following description of exemplary embodiments with reference to the attached drawings.

DESCRIPTION OF THE EMBODIMENTS

An exemplary embodiment according to the present disclosure will be described in detail with reference to the drawings. A configuration of an inkjet recording apparatus will be described as a specific example, but the present disclosure is not limited to the inkjet recording apparatus and can also be applied to an electrophotographic recording apparatus, a thermal-transfer recording apparatus, or the like.

Figure 1:
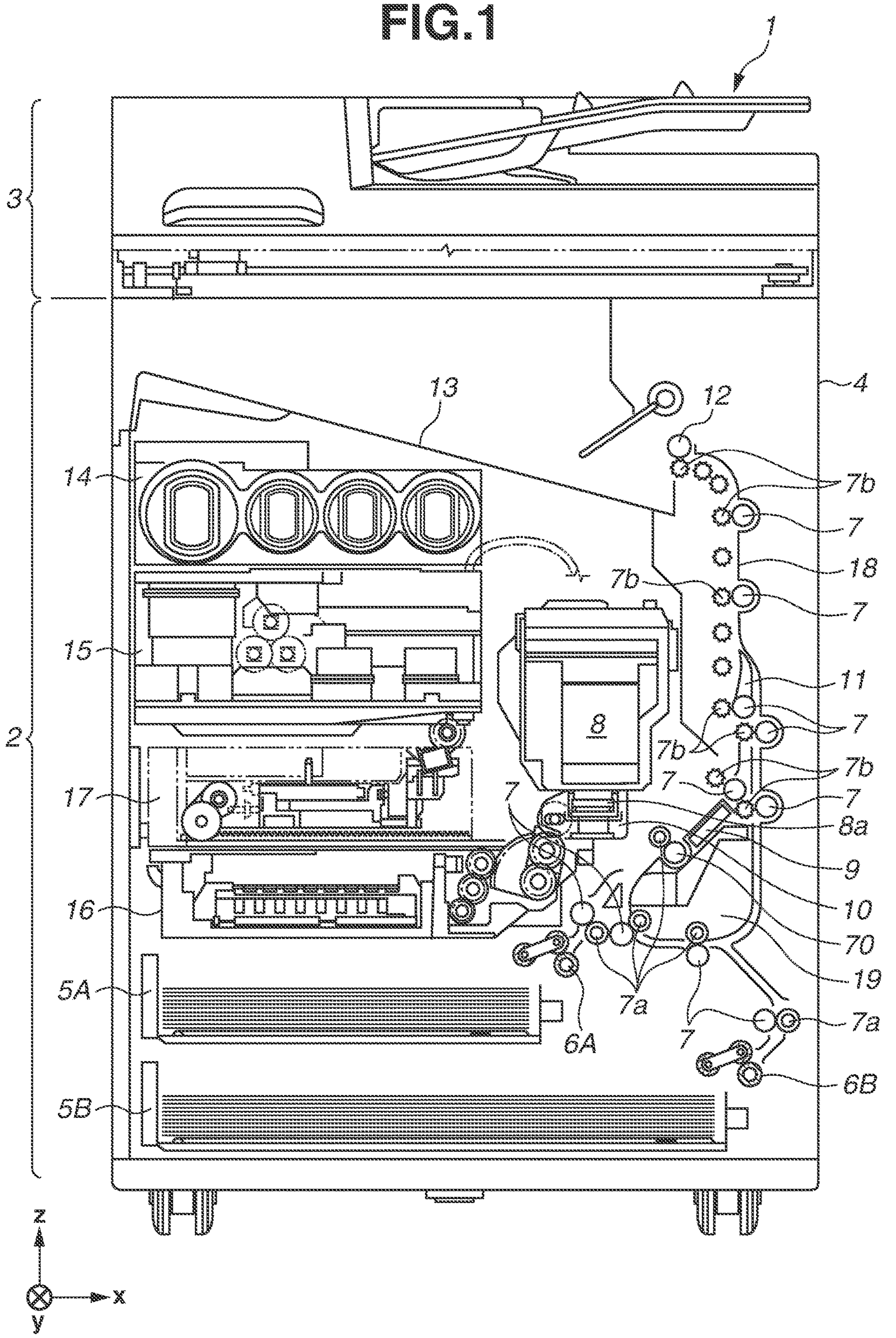
FIG. 1 is a front view of a recording apparatus in a standby state.

FIG. 1 is a diagram illustrating an internal configuration of an inkjet recording apparatus 1 (hereinafter, the recording apparatus 1) to be used in the present exemplary embodiment. In the drawings, an x direction indicates the horizontal direction, a y direction (a direction perpendicular to the paper planes of the drawings) indicates a direction in which ejection ports are arrayed in a recording head 8 to be described below, and a z direction indicates the vertical direction.

In the present specification, "recording medium" is used as a collective term for a medium onto which a liquid is ejected and which is made of a non-metal material such as paper, cloth, plastic film, wood, or leather.

The recording apparatus 1 is a multi-function peripheral including a printing unit 2 and a scanner unit 3, and various types of processing related to a recording operation and a reading operation can be executed by the printing unit 2 and the scanner unit 3 individually or in an interlocking manner. The scanner unit 3 includes an automatic document feeder (ADF) and a flatbed scanner (PBS), and can read (scan) an original document automatically fed by the ADF and an original document placed on a platen glass of the FBS by a user.

The recording apparatus 1 used in the present exemplary embodiment is the multi-function peripheral including the printing unit 2 and the scanner unit 3, but a form in which the scanner unit 3 is not included may be adopted. FIG. 1 illustrates the recording apparatus 1 in a standby state where neither the recording operation nor the reading operation is performed.

In the printing unit 2, a first cassette 5A and a second cassette 5B are each removably installed at the bottom in a lower part of a housing 4 in the vertical direction, as a storage unit for storing recording mediums (cut sheets) S. Relatively small recording mediums of up to an A4 size are stacked and stored in the first cassette 5A, and relatively large recording mediums of up to an A3 size are stacked and stored in the second cassette 5B. A first feeding unit 6A for separating and feeding the stored recording mediums one by one is disposed near the first cassette 5A. Similarly, a second feeding unit 6B is disposed near the second cassette 5B. When the recording operation is performed, the recording medium S is selectively fed from either one of these cassettes. The storage unit for the recording medium S may be a manual feed tray for supplying the recording medium S, in the form of inserting the recording medium S from outside the housing of the recording apparatus 1.

A main conveyance roller 70, each conveyance roller 7, a discharge roller 12, each pinch roller 7*a*, each driven roller 7*b*, a guide 18, an inner guide 19, and a flapper 11 are conveyance mechanisms for guiding the recording medium S in a predetermined direction. The main conveyance roller 70 is disposed immediately upstream of the recording head 8 (a platen 9), and guarantees highly accurate conveyance during image recording. For this reason, for the main conveyance roller 70, a roller having a metal shaft whose surface is coated with ceramic micro-particles is typically used. The conveyance roller 7 is a rubber roller disposed on each of the upstream side and the downstream side of the recording head 8. The main conveyance roller 70 and the conveyance roller 7 are driven by a conveyance motor. The pinch roller 7*a* is a follower roller that rotates while nipping the recording medium S with the main conveyance roller 70 or the conveyance roller 7. The discharge roller 12 is a driven roller disposed on the most downstream side of the recording apparatus 1, and driven by a discharge motor. The driven roller 7*b* conveys the recording medium S while pinching the recording medium S with the conveyance roller 7 or the discharge roller 12 disposed downstream of the recording head 8 (the platen 9).

The recording apparatus 1 has a plurality of motors for driving the above-described driven rollers, and the above-described driven rollers are each connected to one of the plurality of motors. A correspondence between the motor and the driven roller will be described in detail below.

The guide 18 is disposed in a conveyance path for the recording medium S, and guides the recording medium S in a predetermined direction. The inner guide 19 is a member extending in the y direction and having a curved side surface, and guides the recording medium S along the side surface. The flapper 11 is a member for switching the direction in which the recording medium S is conveyed during a double-sided recording operation. A discharge tray 13 is a tray for holding the stacked recording mediums S discharged by the discharge roller 12 upon completion of the recording operation.

The recording head 8 of the present exemplary embodiment is a color inkjet recording head of full-line type, and a plurality of ejection ports that eject ink serving as the liquid based on recording data is arrayed to match the width of the recording medium S along the y direction in FIG. 1. When the recording head 8 is at a standby position, an ejection port surface 8*a* of the recording head 8 faces downward in the vertical direction as illustrated in FIG. 1, and is capped by a cap unit 10. When the recording operation is performed, the orientation of the recording head 8 is changed by a print controller 202 to be described below so that the ejection port surface 8*a* faces the platen 9. The platen 9 is configured of a flat plate extending in the y direction, and supports the back surface of the recording medium S on which the recording operation is performed by the recording head 8. The movement from the standby position of the recording head 8 to a recording position will be described in detail below.

An ink tank unit 14 stores ink of four colors to be supplied to the recording head 8. An ink supply unit 15 is disposed at a point in a channel connecting the ink tank unit 14 and the recording head 8, and adjusts each of the pressure and the flow rate of ink in the recording head 8 to an appropriate range. In the present exemplary embodiment, a circulation-type ink supply system is adopted, and the ink supply unit 15 adjusts each of the pressure of ink to be supplied to the recording head 8 and the flow rate of ink collected from the recording head 8 to an appropriate range.

A maintenance unit 16 includes the cap unit 10 and a wiping unit 17, and performs a maintenance operation on the recording head 8 by activating the cap unit 10 and the wiping unit 17 at predetermined timing. The maintenance operation will be described in detail below.

Figure 2:
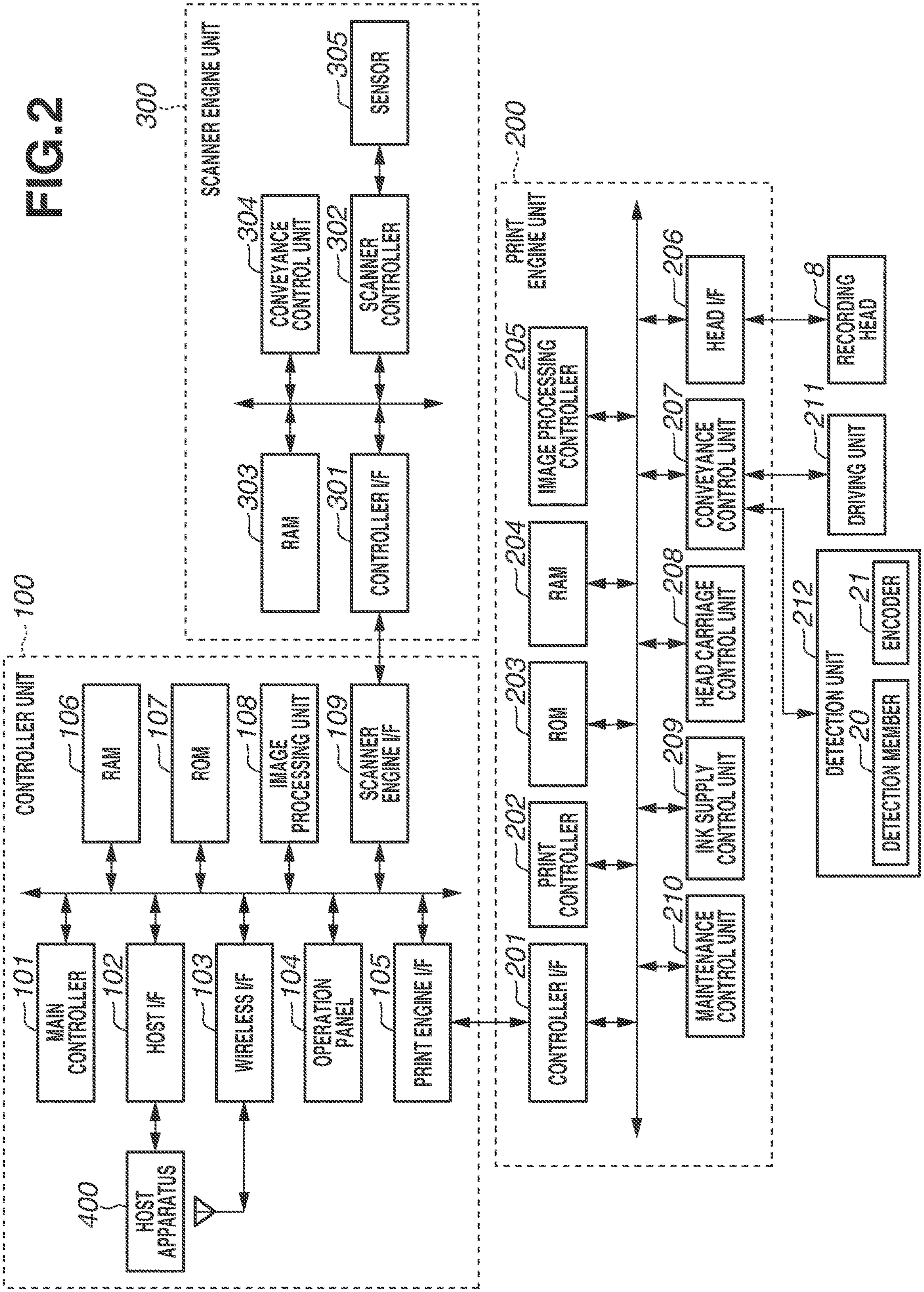
FIG. 2 is a diagram illustrating a control configuration of the recording apparatus.

FIG. 2 is a block diagram illustrating a control configuration in the recording apparatus 1. The control configuration includes a print engine unit 200 that mainly controls the printing unit 2, a scanner engine unit 300 that controls the scanner unit 3, and a controller unit 100 that controls the entire recording apparatus 1. The print controller 202 controls various mechanisms of the print engine unit 200 based on instructions from a main controller 101 of the controller unit 100. Various mechanisms of the scanner engine unit 300 are controlled by the main controller 101 of the controller unit 100. The details of the control configuration will be described.

In the controller unit 100, the main controller 101 including a central processing unit (CPU) controls the entire recording apparatus 1 based on a program and various parameters stored in a read only memory (ROM) 107 while using a random access memory (RAM) 106 as a work area. For example, when a print job is input from a host apparatus 400 via a host interface (I/F) 102 or a wireless I/F 103, an image processing unit 108 performs predetermined image processing on received image data based on an instruction from the main controller 101. The main controller 101 transmits the image data on which the image processing is performed to the print engine unit 200 via a print engine I/F 105.

The recording apparatus 1 may acquire image data from the host apparatus 400 via wireless communication or wired communication, or may acquire image data from an external storage (such as a universal serial bus (USB) memory) connected to the recording apparatus 1. A communication method to be used for the wireless communication or wired communication is not limited. For example, Wireless Fidelity (Wi-Fi®), Bluetooth®, or the like can be applied as the communication method to be used for the wireless communication. USB or the like can be applied as the communication method to be used for the wired communication. For example, when a read command is input from the host apparatus 400, the main controller 101 transmits the command to the scanner unit 3 via a scanner engine I/F 109.

An operation panel 104 is a mechanism for a user to perform input and output with respect to the recording apparatus 1. The user can provide instructions to perform operations such as copying and scanning, can set a print mode, and can recognize information about the recording apparatus 1, via the operation panel 104.

In the print engine unit 200, the print controller 202 including a CPU controls various mechanisms of the printing unit 2 based on a program and various parameters stored in a ROM 203 while using a RAM 204 as a work area. When various commands and image data are received via a controller I/F 201, the print controller 202 stores the various commands and the image data once in the RAM 204. The print controller 202 causes an image processing controller 205 to convert the stored image data into recording data so that the recording head 8 can use the recording data for the recording operation. When the recording data is generated, the print controller 202 causes the recording head 8 to execute the recording operation based on the recording data via a head I/F 206. In this process, the print controller 202 drives the feeding units 6A and 6B, the conveyance roller 7, the discharge roller 12, and the flapper 11 illustrated in FIG. 1 via a conveyance control unit 207, so that the recording medium S is conveyed.

The conveyance control unit 207 (a conveyance controller) is connected to a detection unit 212 that detects a conveyance state of the recording medium S and a driving unit 211 that drives the plurality of driven rollers. The conveyance control unit 207 controls the conveyance of the recording medium S, using the driving unit 211, based on a detection result obtained from the detection unit 212. The detection unit 212 has a detection member 20 that detects the presence or absence of the recording medium S and an encoder 21 that detects a rotation amount of the driven roller.

In the process in which the recording medium S is conveyed by the conveyance control unit 207, the recording operation by the recording head 8 is executed in conjunction with the conveyance operation of the recording medium S, and print processing is performed based on an instruction from the print controller 202.

A head carriage control unit 208 changes the orientation or the position of the recording head 8 depending on an operating state such as a maintenance state or a recording state of the recording apparatus 1. An ink supply control unit 209 controls the ink supply unit 15 so that the pressure of ink to be supplied to the recording head 8 falls within the appropriate range. A maintenance control unit 210 controls the operations of the cap unit 10 and the wiping unit 17 in the maintenance unit 16 when performing the maintenance operation on the recording head 8.

In the scanner engine unit 300, the main controller 101 controls hardware resources of a scanner controller 302, based on the program and various parameters stored in the ROM 107 while using the RAM 106 as the work area. In this way, various mechanisms of the scanner unit 3 are controlled. For example, the main controller 101 controls the hardware resources in the scanner controller 302 via a controller I/F 301, so that an original document placed on the ADF by a user is conveyed via a conveyance control unit 304 and read by a sensor 305. The scanner controller 302 stores read image data into a RAM 303. The print controller 202 can cause the recording head 8 to execute the recording operation based on the image data read by the scanner controller 302 by converting the image data thus acquired into recording data.

Figure 3:
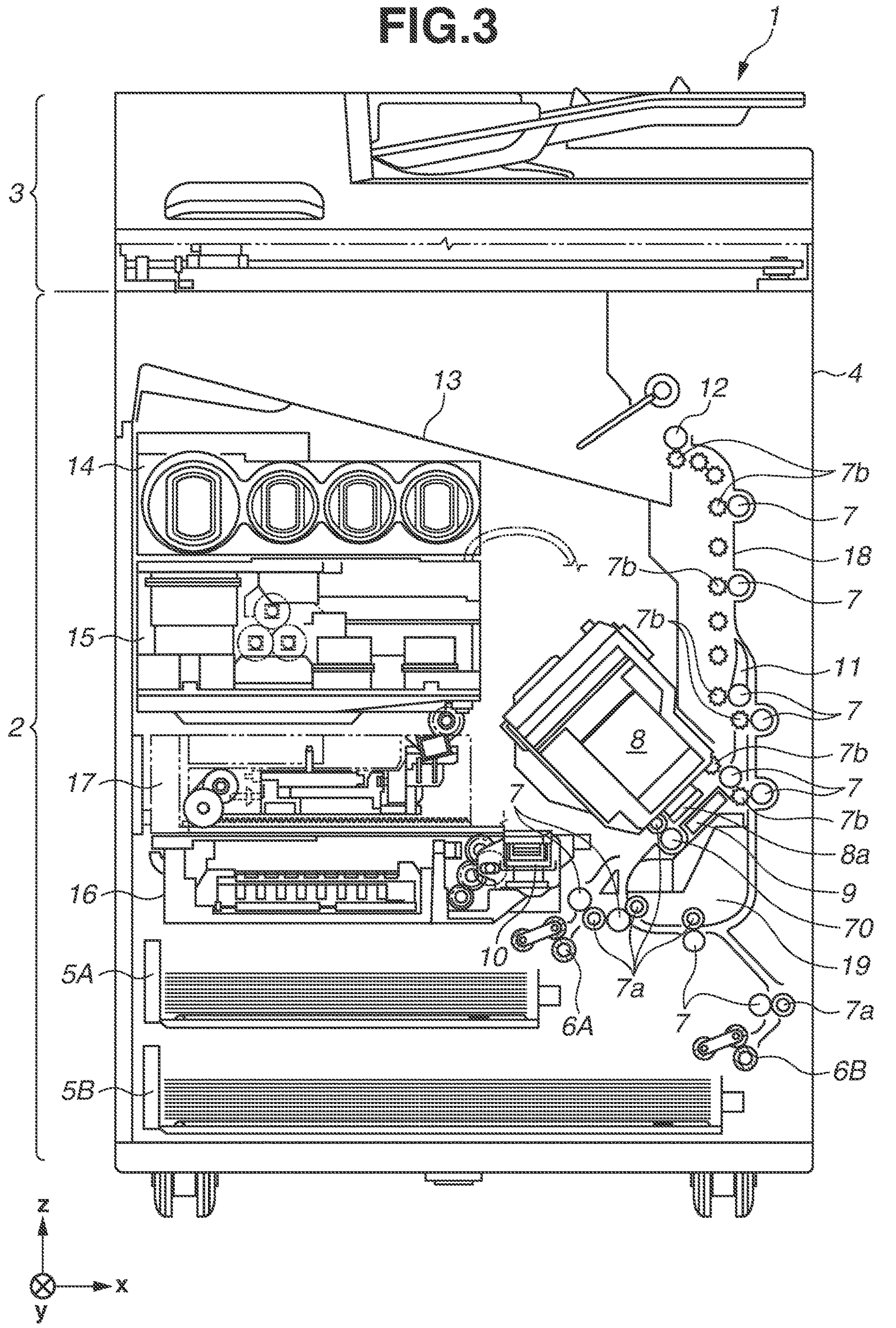
FIG. 3 is a diagram illustrating the recording apparatus in a recording state.

FIG. 3 illustrates the recording apparatus 1 in the recording state. In comparison with the standby state illustrated in FIG. 1, the cap unit 10 is away from the ejection port surface 8*a* of the recording head 8, and the ejection port surface 8*a* faces the platen 9. In the present exemplary embodiment, a flat surface of the platen 9 is inclined at an angle of about 45 degrees with respect to the horizontal direction, and the ejection port surface 8*a* of the recording head 8 at the recording position is also inclined at an angle of about 45 degrees with respect to the horizontal direction so that the distance to the platen 9 is maintained constant.

When moving the recording head 8 from the standby position illustrated in FIG. 1 to the recording position illustrated in FIG. 3, the print controller 202 lowers the cap unit 10 to a retracted position illustrated in FIG. 3, using the maintenance control unit 210. As a result, the ejection port surface 8*a* of the recording head 8 is away from the cap unit 10. Afterward, the print controller 202 rotates the recording head 8 by 45 degrees while adjusting the height of the recording head 8 in the vertical direction using the head carriage control unit 208, so that the ejection port surface 8*a* faces the platen 9. When moving the recording head 8 from the recording position to the standby position upon completing the recording operation, the print controller 202 performs the reverse process to the above-described process.

A conveyance path for the recording medium S in the printing unit 2 will be described. When a recording command is input, at first, the print controller 202 moves the recording head 8 to the recording position illustrated in FIG. 3, using the maintenance control unit 210 and the head carriage control unit 208. Afterward, the print controller 202 drives either the first feeding unit 6A or the second feeding unit 6B based on the recording command, and feeds the recording medium S, using the conveyance control unit 207.

Figure 4C:
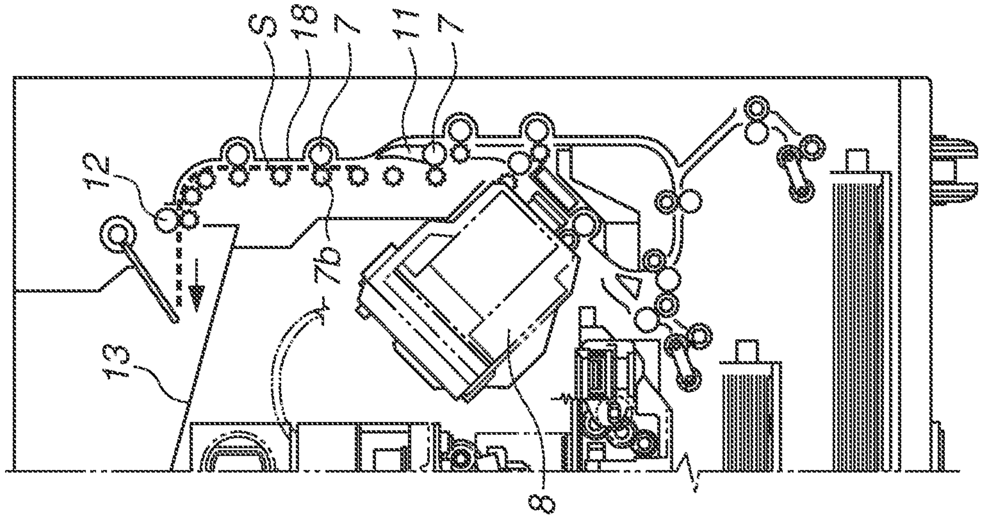
FIGS. 4A to 4C are diagrams each illustrating a conveyance path for a recording medium fed from a first cassette.
Figure 4B:
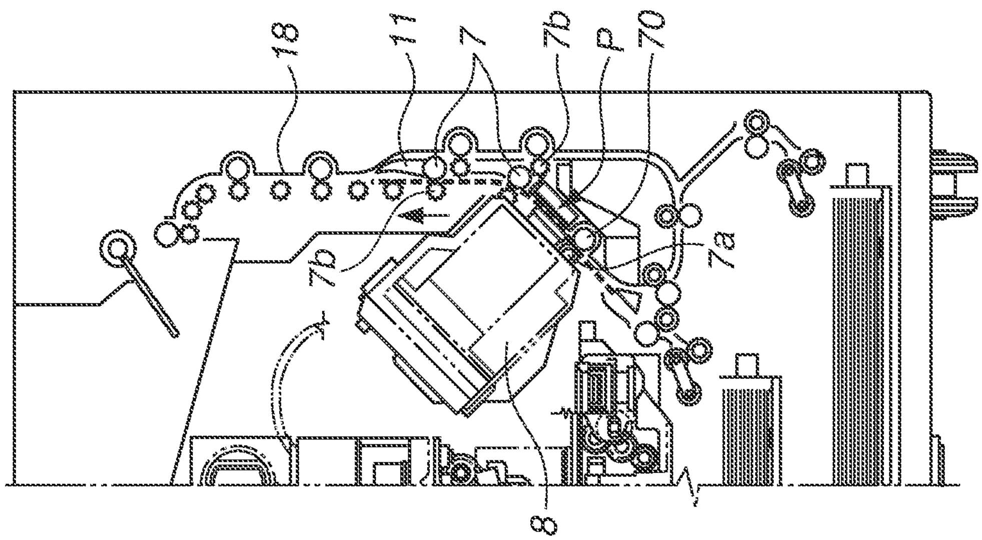
Figure 4A:
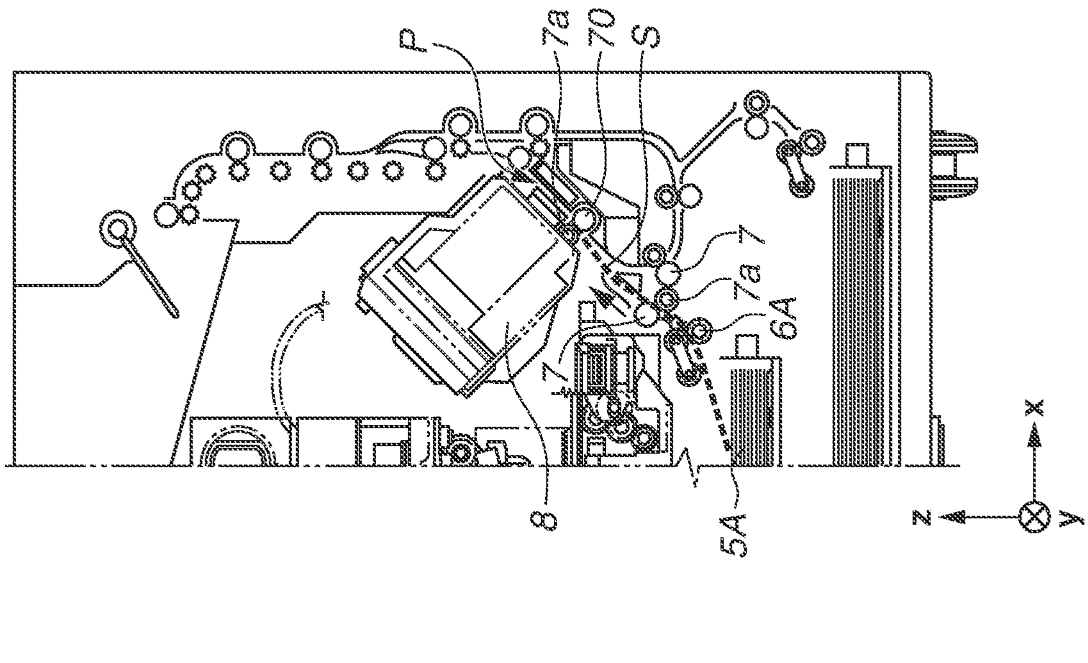

FIGS. 4A to 4C are diagrams each illustrating a conveyance path when the recording medium S of the A4 size stored in the first cassette 5A is fed. The uppermost recording medium S of the recording mediums stacked in the first cassette 5A is separated from the second and subsequent recording mediums by the first feeding unit 6A, and conveyed to a recording area P between the platen 9 and the recording head 8 while being nipped by the conveyance roller 7 and the pinch roller 7*a*. FIG. 4A illustrates a conveyance state immediately before the leading edge of the recording medium S arrives at the recording area P. The traveling direction of the recording medium S is changed to a direction inclined from the horizontal direction (the x direction) at an angle of about 45 degrees with respect to the horizontal direction, before the recording medium S fed from the first feeding unit 6A arrives at the recording area P.

In the recording area P, ink is ejected from the plurality of ejection ports of the recording head 8 toward the recording medium S. The back surface of the recording medium S in the area where the ink is applied is supported by the platen 9, and the distance between the ejection port surface 8*a* and the recording medium S is maintained constant. The recording medium S after the ink is applied is conveyed upward in the vertical direction of the recording apparatus 1 along the guide 18 while being guided by the conveyance roller 7 and the driven roller 7*b* and passing the left side of the flapper 11 whose tip is inclined rightward. FIG. 4B illustrates a state where the leading edge of the recording medium S is conveyed upward in the vertical direction upon passing through the recording area P. The traveling direction of the recording medium S is changed from the position of the recording area P inclined at an angle of about 45 degrees with respect to the horizontal direction to the upward direction in the vertical direction by the conveyance roller 7 and the driven roller 7*b*.

After being conveyed upward in the vertical direction, the recording medium S is discharged to the discharge tray 13 by the discharge roller 12 and the driven roller 7*b*. FIG. 4C illustrates a state where the leading edge of the recording medium S is discharged to the discharge tray 13 upon passing the discharge roller 12. The discharged recording medium S is held on the discharge tray 13 in a state where the surface on which the image is recorded by the recording head 8 faces downward.

Figure 5A:
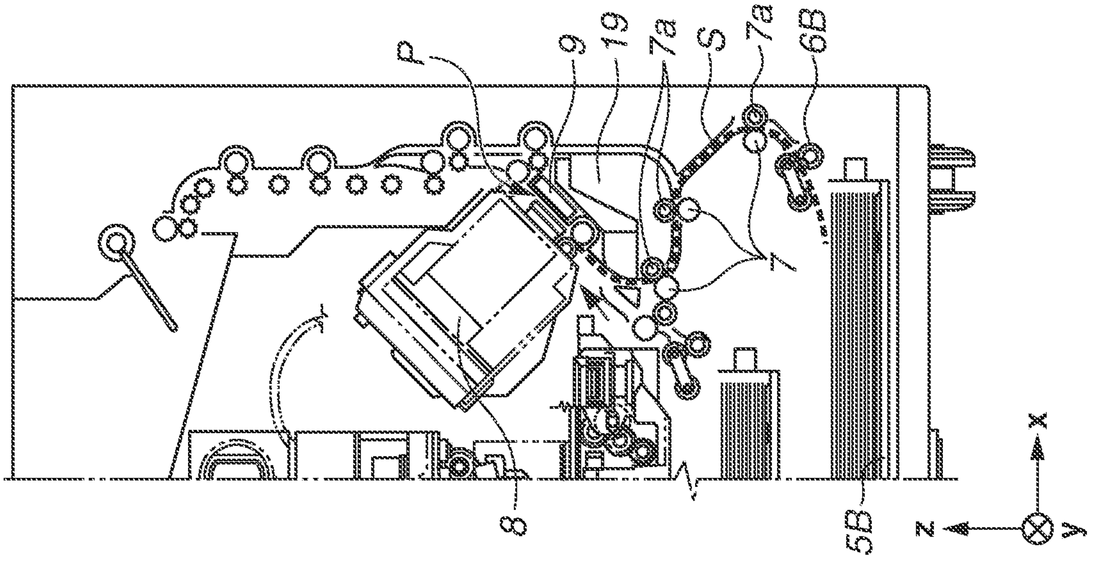
FIGS. 5A to 5C are diagrams each illustrating a conveyance path for a recording medium fed from a second cassette.
Figure 5B:
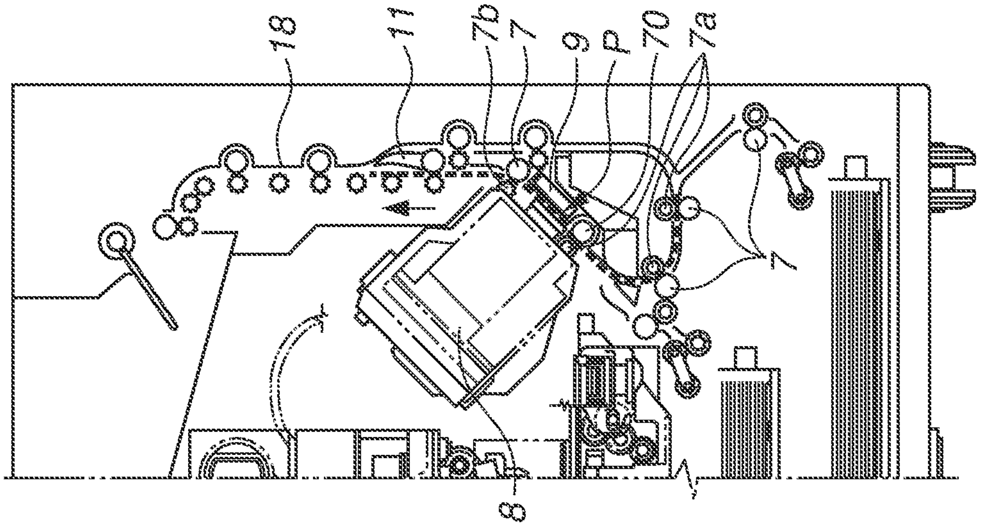
Figure 5C:
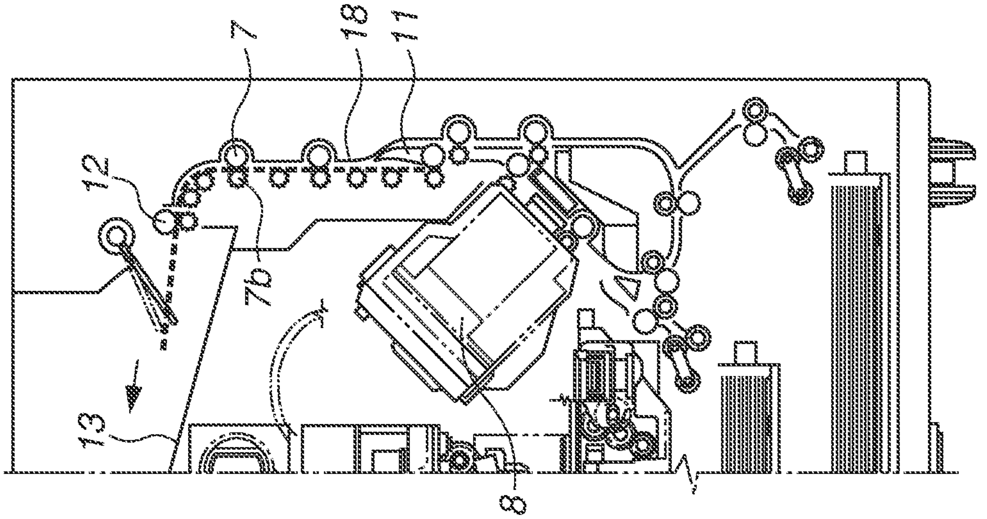

FIGS. 5A to 5C are diagrams each illustrating a conveyance path when the recording medium S of the A3 size stored in the second cassette 5B is fed. The uppermost recording medium S of the recording mediums stacked in the second cassette 5B is separated from the second and subsequent recording mediums by the second feeding unit 6B, and conveyed to the recording area P between the platen 9 and the recording head 8 while being nipped by the conveyance roller 7 and the pinch roller 7*a*.

FIG. 5A illustrates a conveyance state immediately before the leading edge of the recording medium S arrives at the recording area P. The plurality of conveyance rollers 7, the plurality of pinch rollers 7*a*, and the inner guide 19 are disposed in a conveyance path for the recording medium S after being fed by the second feeding unit 6B and before arriving at the recording area P, so that the recording medium S is curved like the letter S and conveyed to the platen 9.

The conveyance path thereafter is similar to that in the case of the recording medium S of the A4 size illustrated in FIGS. 4B and 4C. FIG. 5B illustrates a state where the leading edge of the recording medium S is conveyed upward in the vertical direction upon passing through the recording area P. FIG. 5C illustrates a state where the leading edge of the recording medium S is discharged to the discharge tray 13 upon passing the discharge roller 12.

FIGS. 6A to 6D illustrate a conveyance path in a case where the recording operation (double-sided recording) is performed on the back surface (the second surface) of the recording medium S of the A4 size. In a case where the double-sided recording is performed, the recording operation is performed on the second surface after recording is performed on the first surface. The conveyance process when recording is performed on the first surface is similar to that in FIGS. 4A to 4C, and thus the description thereof will be omitted. A conveyance process after the state in FIG. 4C will be hereinafter described.

Figures 6A, 6B, 6C, 6D:
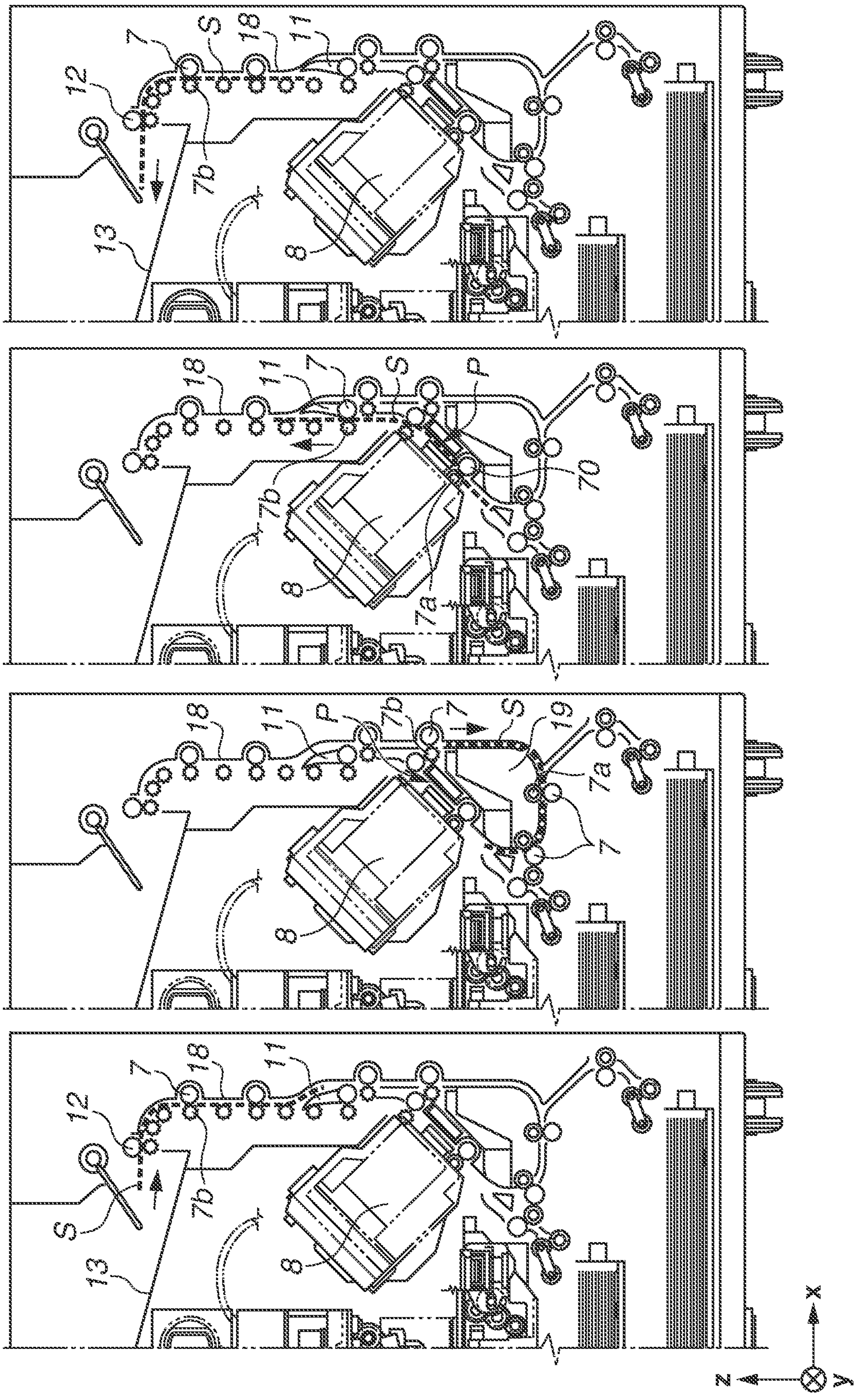
FIGS. 6A to 6D are diagrams each illustrating a conveyance path in a case where a recording operation is performed on the back surface of a recording medium.

When the recording operation on the first surface by the recording head 8 is completed and the trailing edge of the recording medium S has passed the flapper 11, the print controller 202 rotates the conveyance roller 7 in reverse and conveys the recording medium S to the inside of the recording apparatus 1. In this process, the flapper 11 is controlled by an actuator (not illustrated) so that the tip is inclined to the left side, and therefore, the leading edge (the trailing edge in the recording operation on the first surface) of the recording medium S passes the right side of the flapper 11 and is conveyed downward in the vertical direction. FIG. 6A illustrates a state where the leading edge (the trailing edge in the recording operation on the first surface) of the recording medium S passes the right side of the flapper 11.

Afterward, the recording medium S is conveyed along the curved peripheral surface of the inner guide 19 and is conveyed to the recording area P between the recording head 8 and the platen 9 again. In this process, the second surface of the recording medium S faces the ejection port surface *8a* of the recording head 8. FIG. 6B illustrates a conveyance state immediately before the leading edge of the recording medium S arrives at the recording area P, for the recording operation on the second surface.

The conveyance path thereafter is similar to that in the case where recording is performed on the first surface as illustrated in FIGS. 4B and 4C. FIG. 6C illustrates a state where the leading edge of the recording medium S is conveyed upward in the vertical direction upon passing through the recording area P. In this process, the flapper 11 is controlled by the actuator (not illustrated) so that the tip moves to a position inclined to the right side. FIG. 6D illustrates a state where the leading edge of the recording medium S is discharged to the discharge tray 13 upon passing the discharge roller 12. As described above, in a case where recording is performed on the second surface of the recording medium S, the recording medium S passes through the conveyance path illustrated in FIGS. 6A to 6D. In the present exemplary embodiment, in particular, the conveyance path through which the recording medium S passes in FIGS. 6B and 6C will be referred to as a double-sided conveyance path 110.

The maintenance operation on the recording head 8 will be described. As described with reference to FIG. 1, the maintenance unit 16 of the present exemplary embodiment includes the cap unit 10 and the wiping unit 17, and they are activated at the predetermined timing to perform the maintenance operation.

Figure 7:
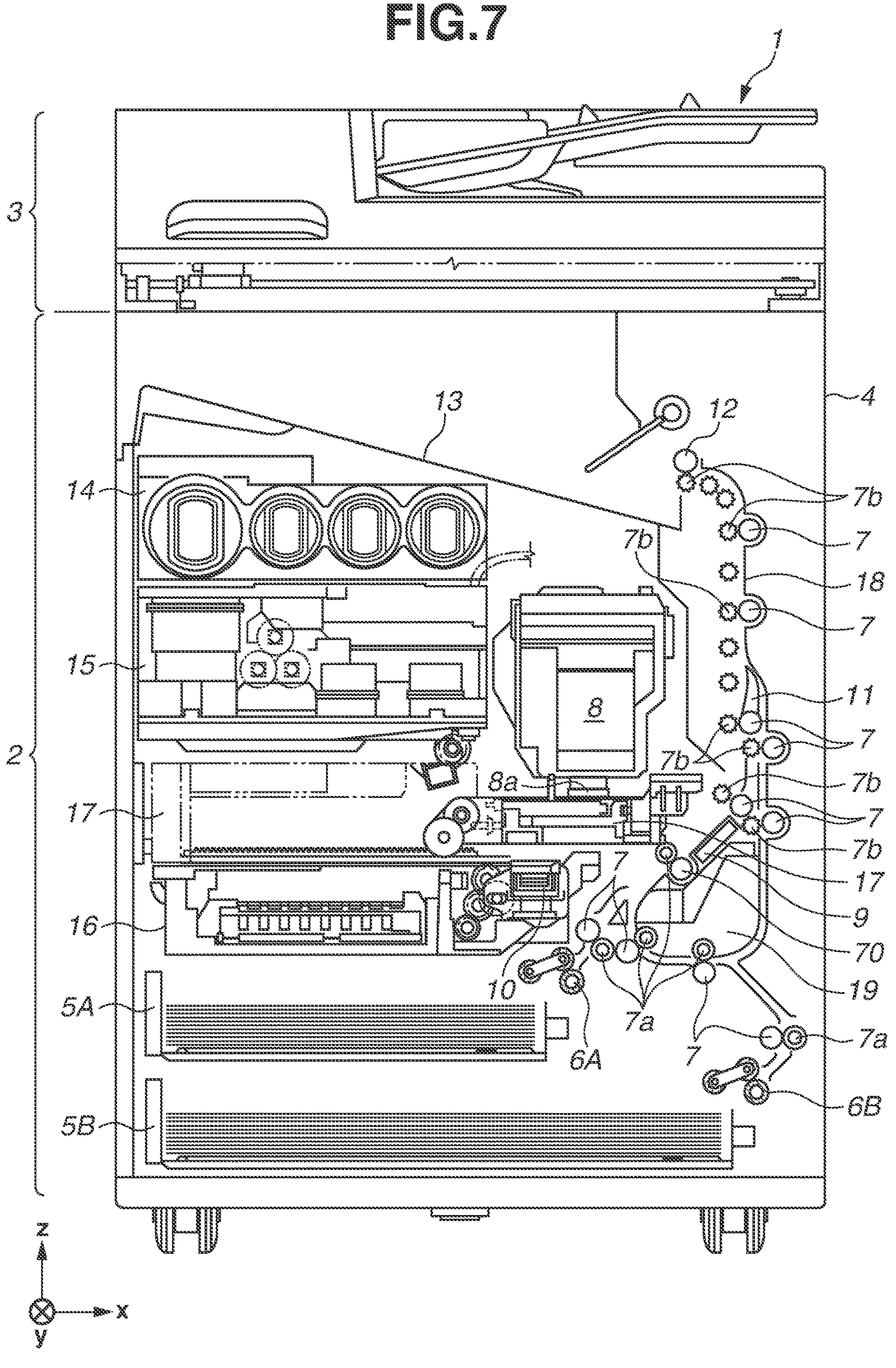
FIG. 7 is a diagram illustrating the recording apparatus in a maintenance state.

FIG. 7 is a diagram illustrating the recording apparatus 1 in the maintenance state. When moving the recording head 8 from the standby position illustrated in FIG. 1 to a maintenance position illustrated in FIG. 7, the print controller 202 moves the recording head 8 upward in the vertical direction and moves the cap unit 10 downward in the vertical direction. The print controller 202 moves the wiping unit 17 in the rightward direction in FIG. 7 from a retracted position. Afterward, the print controller 202 moves the recording head 8 downward in the vertical direction to the maintenance position at which the maintenance operation can be performed.

Meanwhile, when moving the recording head 8 from the recording position illustrated in FIG. 3 to the maintenance position illustrated in FIG. 7, the print controller 202 moves the recording head 8 upward in the vertical direction while rotating the recording head 8 45 degrees. The print controller 202 moves the wiping unit 17 in the rightward direction from the retracted position. Afterward, the print controller 202 moves the recording head 8 downward in the vertical direction to the maintenance position at which the maintenance unit 16 can perform the maintenance operation.

Figure 8:
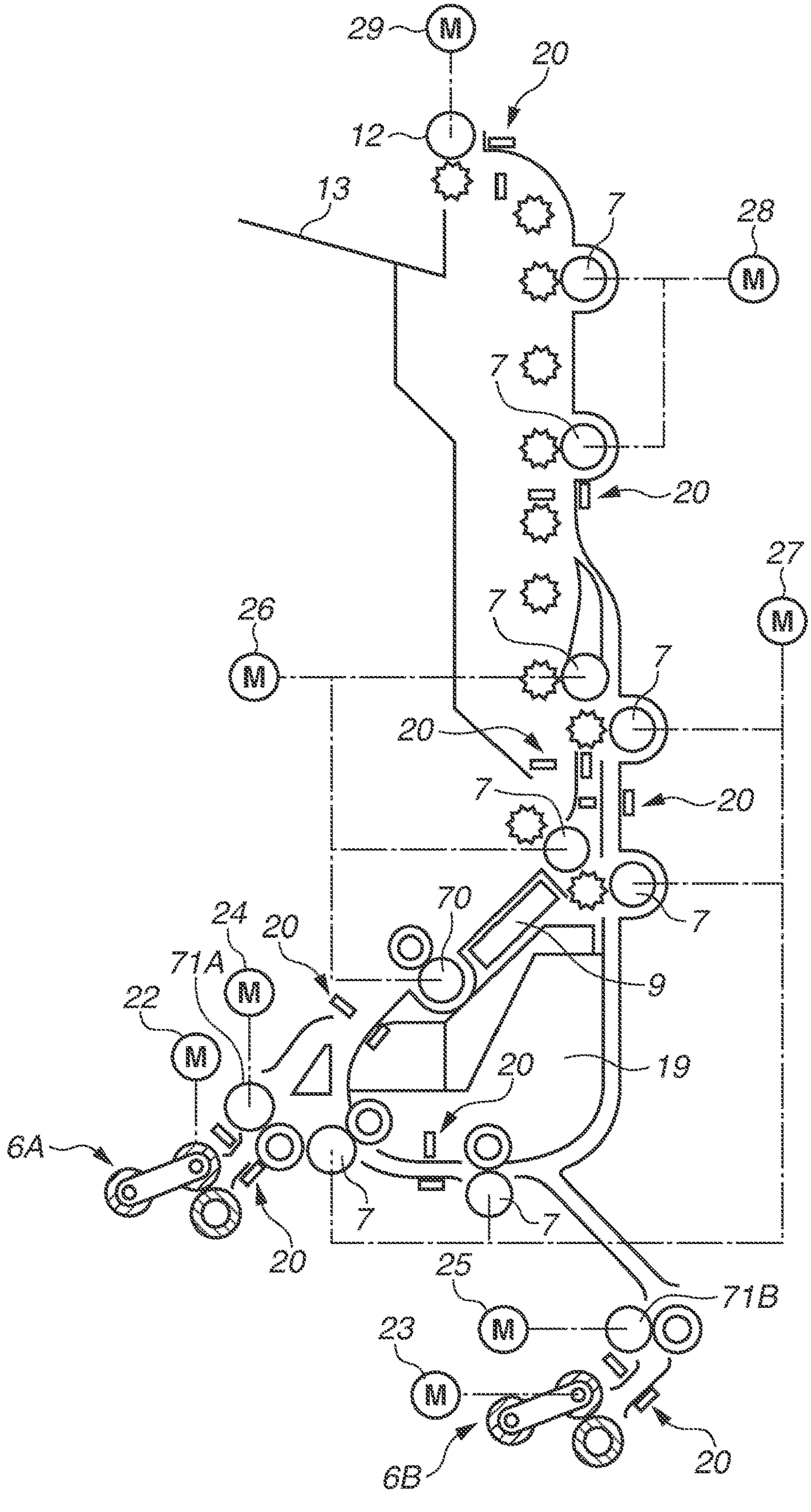
FIG. 8 is a diagram illustrating a correspondence between a driven roller and a motor.

FIG. 8 is a diagram illustrating a correspondence between the plurality of motors and driven rollers in the recording apparatus 1.

A first feeding motor 22 drives the first feeding unit 6A for feeding the recording medium S from the first cassette 5A. A second feeding motor 23 drives the second feeding unit 6B for feeding the recording medium S from the second cassette 5B. A first conveyance motor 24 drives a first intermediate roller 71A serving as the conveyance roller 7, which is the first roller to convey the recording medium S fed by the first feeding unit 6A. A second conveyance motor 25 drives a second intermediate roller 71B, which is the first roller to convey the recording medium S fed by the second feeding unit 6B.

A main conveyance motor 26 drives the main conveyance roller 70 disposed upstream of the platen 9 and mainly conveying the recording medium S during recording. The main conveyance motor 26 drives the two conveyance rollers 7 disposed downstream of the platen 9 and conveying the recording medium S conveyed by the main conveyance roller 70 further downstream.

A third conveyance motor 27 drives the two conveyance rollers 7 that convey the recording medium S having the first surface on which recording is performed downward. The third conveyance motor 27 drives the two conveyance rollers 7 disposed along the inner guide 19 and conveying the recording medium S conveyed by the second intermediate roller 71B or the recording medium S turned upside down after recording is performed on the first surface toward the recording head 8.

A fourth conveyance motor 28 drives the two conveyance rollers 7 that convey the recording medium S after the recording operation is performed upward or downward. A discharge motor 29 drives the discharge roller 12 that discharges the recording medium S on which recording is performed to the discharge tray 13. In this way, the two feeding motors 22 and 23, the five conveyance motors 24 to 28, and the discharge motor 29 each correspond to the one or more driven rollers.

Meanwhile, the detection member 20 for detecting the presence or absence of the recording medium S is disposed at each of eight places along the conveyance path. Each of the detection members 20 includes a sensor and a mirror disposed opposite each other across the conveyance path, the sensor having a light emitter and a light receiver is disposed on one side of the conveyance path, and the mirror is disposed at a position facing the mirror and located on the other side of the conveyance path. The presence or absence of the recording medium S, i.e., the passage of the leading edge or the trailing edge, is determined based on whether light emitted from the light emitter of the sensor and reflected by the mirror is detected by the detector.

The conveyance control unit 207 drives the feeding motors 22 and 23, the conveyance motors 24 to 28, and the discharge motor 29, based on a detection result of each of the plurality of detection members 20 and an output value of the encoder 21 that detects the rotation amount of each of the driven rollers, thereby controlling the conveyance of the entire apparatus.

A first exemplary embodiment will be described. As illustrated in FIGS. 4A to 4C and FIGS. 5A to 5C, the recording medium S is conveyed from the first cassette 5A or the second cassette 5B to the recording area P. During the conveyance of the recording medium S, motions such as friction between the recording medium S and components forming the conveyance path and abrasion between the recording medium S and the driven rollers occur. Then, the recording medium S is positively or negatively charged by the motion such as friction or abrasion.

When the charged recording medium S is conveyed to the recording area P, a coulomb force is generated by the potential difference between the recording medium S and the recording head 8. Dust on the front surface of the recording medium S can attach to the ejection port surface 8*a* of the recording head 8 because of the coulomb force. If the ejection ports formed in the ejection port surface 8*a* of the recording head 8 are blocked by the dust, ink drops are not ejected, which can disrupt image formation.

Figure 9:
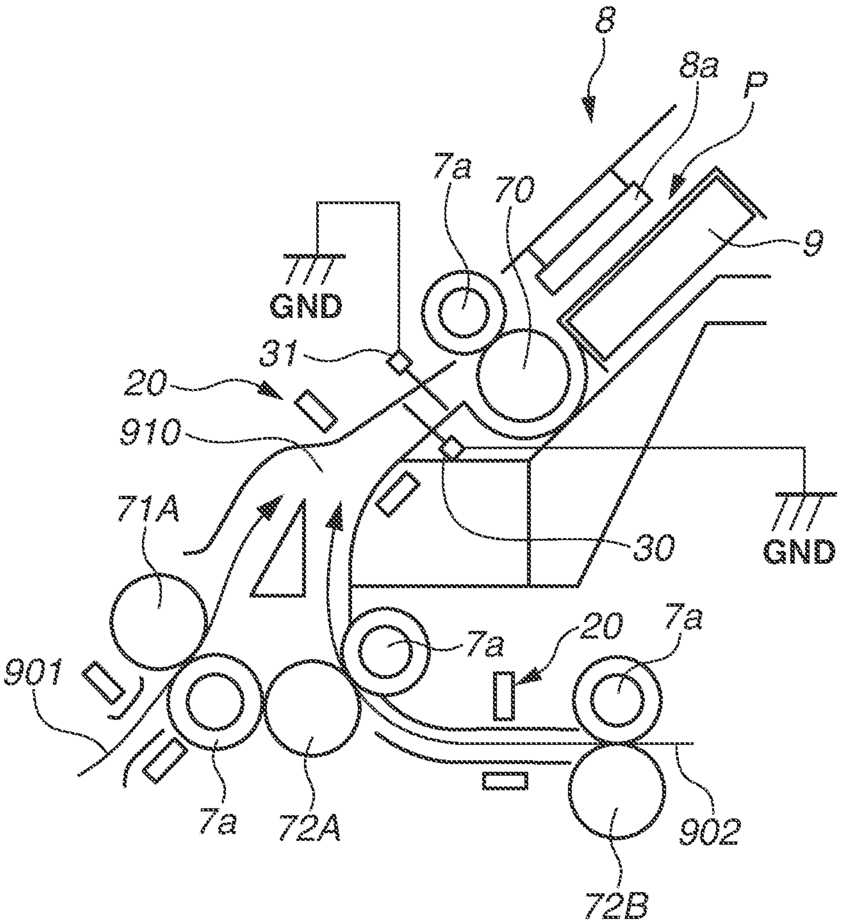
FIG. 9 is a diagram illustrating an arrangement of charge eliminating brushes inside the recording apparatus according to a first exemplary embodiment.

FIG. 9 is a diagram illustrating an arrangement of charge eliminating brushes inside the recording apparatus 1. A charge eliminating brush 30 (a second charge eliminator) and a charge eliminating brush 31 (a first charge eliminator) are disposed upstream of the recording head 8 in the conveyance direction. The charge eliminating brush 30 is disposed to be in contact with the second surface of the recording medium S, and the charge eliminating brush 31 is disposed to be in contact with the first surface of the recording medium S. The charge eliminating brushes 30 and 31 are disposed upstream of the recording head 8 in the conveyance direction, so that charge elimination of the recording medium S is performed before recording on the recording medium S is performed. The charge eliminating brush 31 is disposed downstream of the charge eliminating brush 30 in the conveyance direction.

The charge eliminating brushes 30 and 31 are disposed downstream of a junction 910 between conveyance path s 901 and 902 in the conveyance direction. The conveyance path 901 is a conveyance path through which the recording medium S moving from the first cassette 5A toward the recording area P is to pass, and the conveyance path 902 is a conveyance path formed by combining a conveyance path 111 (see FIG. 11) through which the recording medium S moving from the second cassette 5B toward the recording area P is to pass and the double-sided conveyance path 110. Because the charge eliminating brushes 30 and 31 are thus disposed, the charge elimination is performed on the first surface and the second surface of both of the recording medium S conveyed on the conveyance path 901 and the recording medium S conveyed on the conveyance path 902.

The charge eliminating brushes 30 and 31 can be disposed upstream of the junction 910 in the conveyance direction. In this case, in each of the conveyance path s 901 and 902, the charge eliminating brushes 30 and 31 are both disposed upstream of the junction 910 in the conveyance direction. Alternatively, in each of the conveyance path s 901 and 902, the charge eliminating brush 30 is disposed upstream of the junction 910 in the conveyance direction, and the charge eliminating brush 31 is disposed downstream of the junction 910 in the conveyance direction. In both cases, the placement order of the charge eliminating brushes 30 and 31 may be reversed. For both of the recording medium S conveyed on the conveyance path 901 and the recording medium S conveyed on the conveyance path 902, the charge elimination of the first surface and the second surface is performed in such an arrangement.

Desirably, the charge eliminating brush 30 is disposed downstream of the rubber roller closest to the recording area P in the conveyance direction among the rubber rollers serving as a conveyance unit located upstream of the recording area P in the conveyance direction. This is to prevent the recording medium S from being charged again by passing through the nip portion of the rubber roller after the charge elimination of the recording medium S, because the recording medium S is charged most easily at the nip portion of the rubber roller. For example, on the conveyance path 901 of the present exemplary embodiment, the rubber roller closest to the recording area P is the first intermediate roller 71A, and thus it is desirable that the charge eliminating brushes 30 and 31 be disposed downstream of the first intermediate roller 71A in the conveyance direction. On the conveyance path 902, the rubber roller closest to the recording area P is a conveyance roller 72A among the conveyance rollers 7, and thus it is desirable that the charge eliminating brushes 30 and 31 be disposed downstream of the conveyance roller 72A in the conveyance direction.

The charge eliminating brushes 30 and 31 in the present exemplary embodiment are each shaped like a bundle of bristles made of conductive stainless steel fiber or the like, and are each connected to a ground portion (not illustrated). Charges are eliminated from a charged object near the charge eliminating brushes 30 and 31 in this configuration. In general, it is desirable to set a charge eliminating brush to be in contact with a charged object or to be separate from the charged object by a separation amount of 1 mm or less.

Desirably, the charge eliminating brushes 30 and 31 are disposed to extend in the width direction of the recording medium S.

FIGS. 10A to 10E are conceptual diagrams each illustrating a charged state of the recording medium S during a time after the recording medium S is fed from the first cassette 5A and before the recording medium S is conveyed to the recording area P.

Figure 10A:
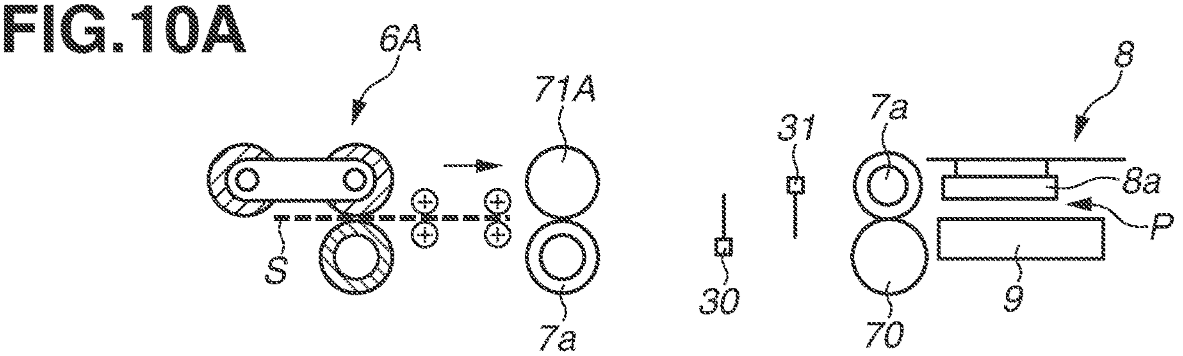
FIGS. 10A to 10E are conceptual diagrams each illustrating a charged state of a recording medium after the recording medium is fed from the first cassette and before the recording medium is conveyed to a recording area.

FIG. 10A illustrates a state where the recording medium S is separated from the recording mediums in the first cassette 5A. The uppermost recording medium S of the recording mediums stacked in the first cassette 5A is separated from the second and subsequent recording mediums by the first feeding unit 6A. The first feeding unit 6A includes a rubber roller, and the recording medium S is charged by the influence of friction caused by the rubber roller. It is known that, in general, when friction between a sheet and a rubber occurs, the sheet is positively charged.

Figure 10B:
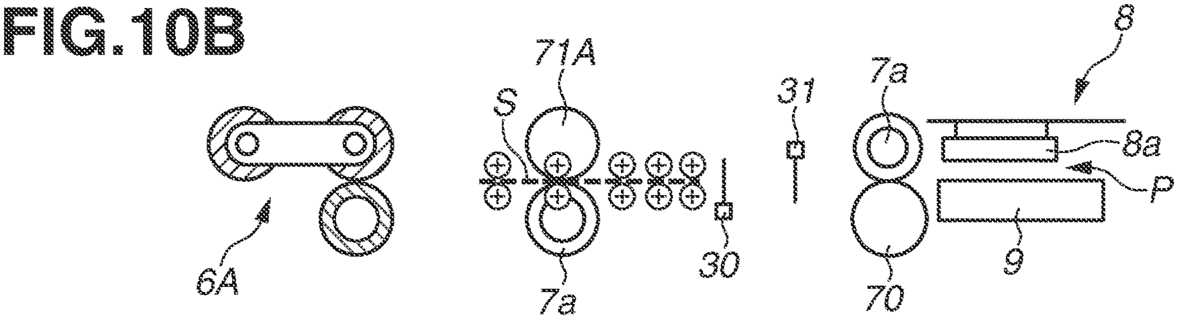

FIG. 10B illustrates a state where the recording medium S conveyed by the first feeding unit 6A is conveyed downstream in the conveyance direction. The recording medium S conveyed by the first feeding unit 6A is continuously conveyed downstream in the conveyance direction while being nipped by the first intermediate roller 71A and the pinch roller 7*a*. Here, the recording medium S is charged by the influence of the first feeding unit 6A and also further charged by the nip portion of the first intermediate roller 71A that is a rubber roller.

Figure 10C:
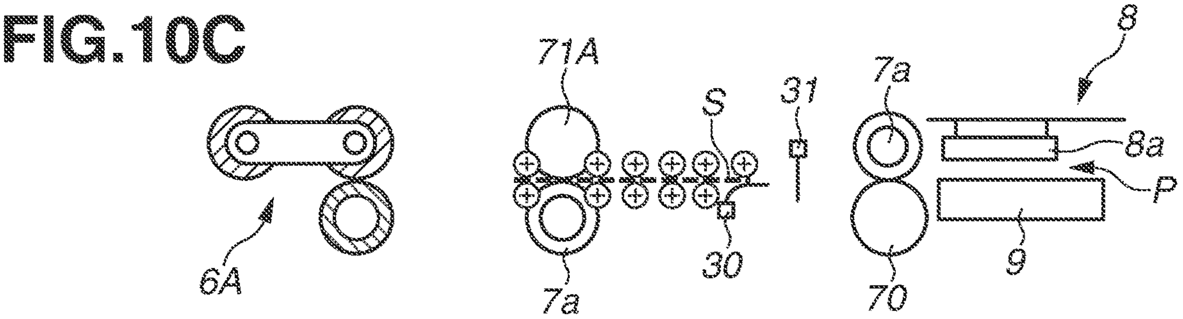

FIG. 10C illustrates a state where the recording medium S is in contact with the charge eliminating brush 30. The recording medium S conveyed by the first intermediate roller 71A comes in contact with the charge eliminating brush 30. Here, because the charge eliminating brush 30 is disposed on the side where the second surface of the recording medium S is to be present, charge elimination is performed mainly on the side where the second surface of the recording medium S is present.

Figure 10D:
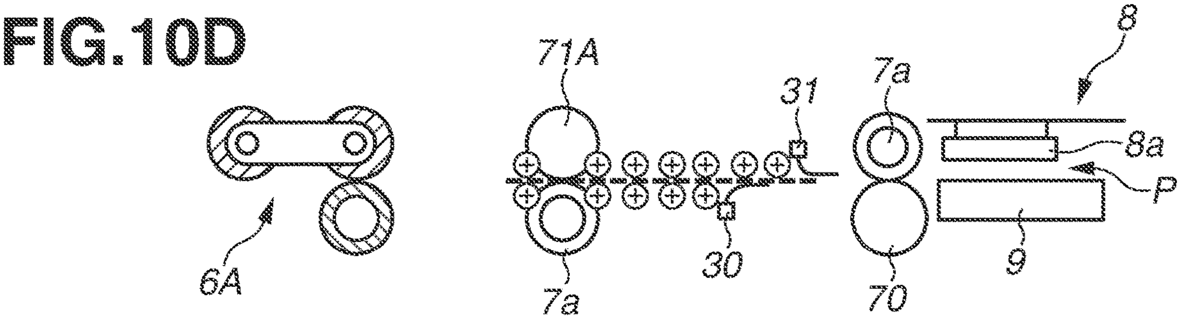

FIG. 10D illustrates a state where the recording medium S conveyed by the first intermediate roller 71A is in contact with the charge eliminating brush 31. The recording medium S conveyed by the first intermediate roller 71A starts coming into contact with the charge eliminating brush 31 disposed downstream of the charge eliminating brush 30 in the conveyance direction. Because the charge eliminating brush 31 is disposed on the side where the first surface of the recording medium S is to be present, charge elimination is performed by the charge eliminating brush 31 mainly on the side where the first surface of the recording medium S is present.

Figure 10E:
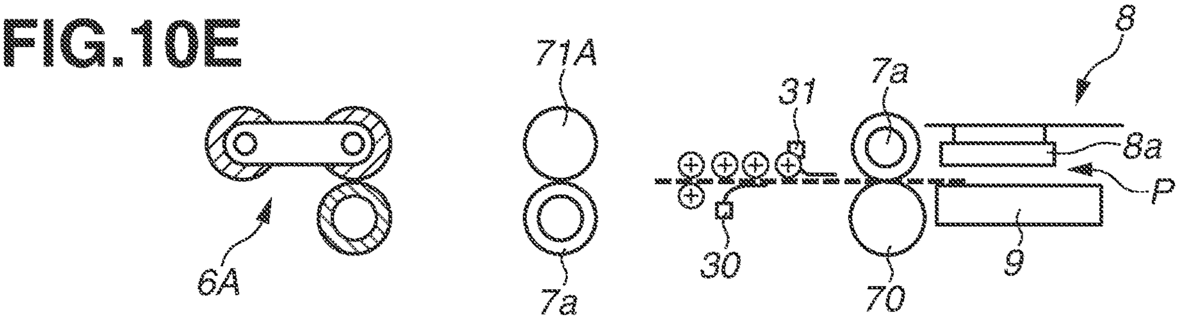

FIG. 10E illustrates a state where the recording medium S arrives at the main conveyance roller 70 and is conveyed to the recording area P. The recording medium S conveyed by the first intermediate roller 71A arrives at the nip portion of the main conveyance roller 70 and is continuously conveyed. When the recording medium S conveyed to the main conveyance roller 70 arrives at the recording area P, the recording operation by the recording head 8 begins. The main conveyance roller 70 is a non-rubber metal roller as described above. For this reason, the recording medium S is not charged to a great extent by being conveyed by the main conveyance roller 70. Accordingly, the recording medium S is conveyed to the recording area P in a nearly uncharged state owing to the charge elimination by the two charge eliminating brushes 30 and 31, and the recording operation by the recording head 8 begins.

The recording head 8 is in a nearly uncharged state by the influence of moisture of ink present on the ejection port surface 8*a*. As described above, the recording medium S is conveyed to the recording area P in the nearly uncharged state owing to the charge elimination of the two charge eliminating brushes 30 and 31. For this reason, generation of a coulomb force based on the potential difference between the recording medium S and the recording head 8 is curbed. For this reason, it is possible to inhibit attraction and adhesion of dust on the recording medium S to the recording head 8 during the recording operation in the recording area P.

How the charge elimination of the recording medium S on the conveyance path 901 is performed is described with reference to FIGS. 10A to 10E, and charge elimination is similarly performed on the recording medium S passing on the conveyance path 902. In a case where the recording medium S is conveyed via the double-sided conveyance path 110, among cases where the recording medium S passes through the conveyance path 902, the first surface and the second surface are reversed. In a case where the front surface and the back surface of the recording medium S are reversed, the charge eliminating brush 30 comes into contact with the first surface of the recording medium S, and the charge eliminating brush 31 comes in contact with the second surface.

In the present exemplary embodiment, charges are eliminated from the second surface and the first surface of the recording medium S in this order by the charge eliminating brushes 30 and 31. However, the positions of the charge eliminating brushes 30 and 31 in the conveyance direction may be reversed, and charges may be eliminated from the first surface and the second surface of the recording medium S in this order. In this case, charge elimination is performed on the recording medium S conveyed via the double-sided conveyance path 110, in order of the second surface and the first surface.

The present disclosure is not limited to the form where the charge eliminating brushes 30 and 31 are disposed upstream of the main conveyance roller 70 in the conveyance direction. For example, both or either one of the charge eliminating brushes 30 and 31 may be disposed between the main conveyance roller 70 and the recording area P. Further, a plurality of charge eliminating brushes 30 and charge eliminating brushes 31 may be disposed downstream of the junction 910 between the conveyance paths 901 and 902 in the conveyance direction, if a form where charge elimination is performed on both surfaces of the recording medium S is adopted.

A second exemplary embodiment will be described, but the description of configurations similar to those of the first exemplary embodiment described above will be omitted.

In the first exemplary embodiment, in a case where the double-sided recording is performed on the recording medium S, the charge eliminating brush 30 comes into contact with the first surface of the recording medium S on which recording has been already performed, before recording is performed on the second surface by the recording head 8. In this process, ink ejected from the recording head 8 attaches to the first surface of the recording medium S. Accordingly, the ink on the first surface of the recording medium S can attach to and thereby stain the charge eliminating brush 30, and the ink can be transferred to the second surface of the pre-recording recording medium S to be fed next.

As a way to address the above situation, there can be adopted a method of providing a predetermined standby time after recording of the first surface of the recording medium S by the recording head 8 and before the recording medium S arrives again at the charge eliminating brush 30 via the double-sided conveyance path 110. The recording medium S thereby passes a position facing the charge eliminating brush 30 after the ink attaching to the first surface of the recording medium S is dried, and accordingly, attachment of the ink to the charge eliminating brush 30 can be prevented even if the charge eliminating brush 30 comes into contact with the first surface after the recording. However, if the predetermined standby time is provided, the productivity of the recording apparatus 1 decreases because the conveyance of the recording medium S temporarily stops.

Figure 11:
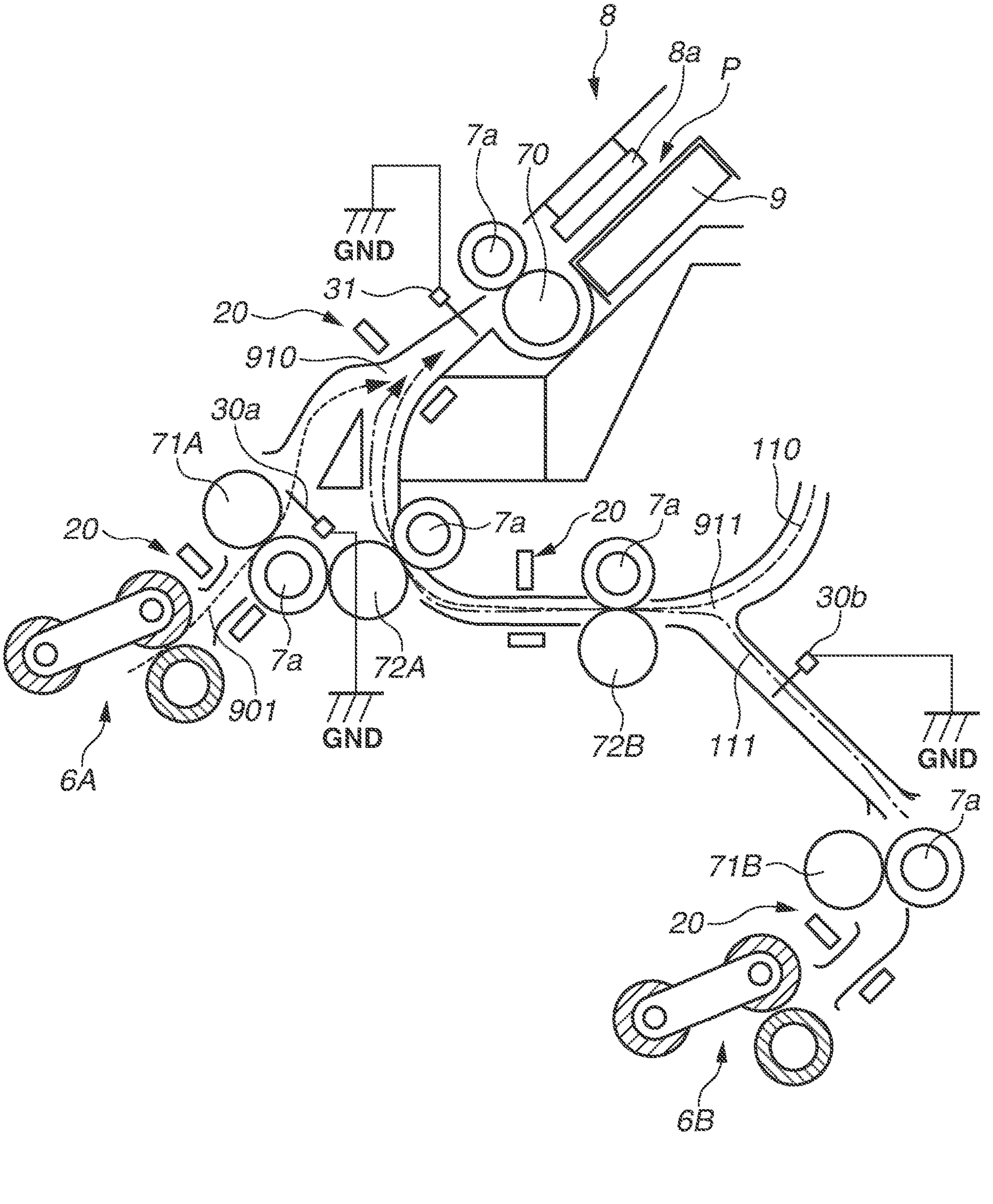
FIG. 11 is a conceptual diagram illustrating an arrangement of charge eliminating brushes inside the recording apparatus according to a second exemplary embodiment.

FIG. 11 is a conceptual diagram illustrating an arrangement of the charge eliminating brushes inside the recording apparatus 1 in the present exemplary embodiment.

In the present exemplary embodiment, the charge eliminating brush 30 to come into contact with the second surface of the recording medium is not on the double-sided conveyance path 110 (a broken-line arrow). Instead, the charge eliminating brush 30 is disposed at each of a position where the charge eliminating brush 30 can be in contact with the recording medium S fed from the first cassette 5A and a position where the charge eliminating brush 30 can be in contact with the recording medium S fed from the second cassette 5B. First, a charge eliminating brush 30*a* (the second charge eliminator) is disposed on the conveyance path 901 (a dotted-line arrow) that serves as a first conveyance path, and upstream of the junction 910 in the conveyance direction. The charge eliminating brush 30*a* eliminates charges from the second surface of the recording medium S fed from the first cassette 5A.

A charge eliminating brush 30*b* (a third charge eliminator) is disposed on the conveyance path 111 (a dashed-dotted line arrow) that serves as a second conveyance path, and upstream of a junction 911 between the double-sided conveyance path 110 and the conveyance path 111 in the conveyance direction. The charge eliminating brush 30*b* eliminates charges from the second surface of the recording medium S fed from the second cassette 5B.

In such a configuration, the charge eliminating brush 30 does not come into contact with the first surface of the recording medium S immediately after recording, so that attachment of ink to the charge eliminating brush 30 can be prevented.

In the present exemplary embodiment as well, the charge eliminating brush 31 may be disposed downstream of the main conveyance roller 70 in the conveyance direction, if the charge eliminating brush 31 is disposed upstream of the recording area P in the conveyance direction. There may be provided a configuration in which both or either one of the charge eliminating brushes 30 and 31 may be disposed at a position near and downstream (a position immediately downstream) of the feeding units 6A and 6B in the conveyance direction. However, in a case where the charge eliminating brushes 30 and 31 are disposed at the position immediately downstream of the feeding units 6A and 6B, the recording medium S can be charged again before recording is performed by the recording head 8, because of the influence of the rubber roller on the downstream side of the conveyance direction.

Further, in the present exemplary embodiment, a plurality of charge eliminating brushes including the charge eliminating brush 30*a* may be disposed on the conveyance path 901 and upstream of the junction 910 in the conveyance direction. A plurality of charge eliminating brushes including the charge eliminating brush 30*b* may be disposed on the conveyance path 111 and upstream of the junction 911 between the double-sided conveyance path 110 and the conveyance path 111 in the conveyance direction.

According to the exemplary embodiments of the present disclosure, a recording apparatus capable of performing charge elimination on both surfaces of a recording medium can be provided.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-108169, filed Jun. 29, 2021, which is hereby incorporated by reference herein in its entirety.

What is claimed is:

1. A recording apparatus comprising:

a storage unit configured to store a recording medium;

a first feeding unit configured to feed the recording medium from the storage unit;

a recording unit having a recording area where recording is to be performed by the recording unit;

a main conveyance roller disposed immediately upstream of the recording unit and configured to convey the recording medium in a first direction to the recording area;

a conveyance path through which the recording medium passes in a case where the recording medium is conveyed from the storage unit towards the recording area by the first feeding unit;

a first intermediate roller disposed on the conveyance path downstream of the first feeding unit as a rubber roller closest to the recording area;

a double-sided conveyance path through which the recording medium passes after recording is performed on a first surface of the recording medium by the recording unit and before recording to be performed on a second surface of the recording medium is performed by the recording unit;

a junction disposed between the conveyance path and the double-sided conveyance path and between the main conveyance roller and the first intermediate roller;

a first charge eliminator disposed between the junction and the main conveyance roller and configured to eliminate charges from the first surface of the recording medium; and a second charge eliminator disposed between the junction and the main conveyance roller and configured to eliminate charges from the second surface of the recording medium.

2. The recording apparatus according to claim 1, wherein the first charge eliminator is disposed at a first position downstream in the first, direction relative to the main conveyance roller, and wherein the second charge eliminator is disposed at a second position downstream in the first, direction relative to the main conveyance roller.

3. The recording apparatus according to claim 1, wherein the first charge eliminator is disposed at a position downstream of the second charge eliminator in the first direction.

4. The recording apparatus according to claim 1, wherein the first charge eliminator is configured to eliminate charges from the second surface of the recording medium that has passed through the double-sided conveyance path.

5. The recording apparatus according to claim 1, wherein each of the first charge eliminator and the second charge eliminator is a charge eliminating brush shaped like a bundle of bristles.

6. The recording apparatus according to claim 1, wherein the first charge eliminator and the second charge eliminator are each connected to a ground portion.

7. The recording apparatus according to claim 1, wherein the recording unit is a recording head configured to eject a liquid.

8. The recording apparatus according to claim 1, wherein the main conveyance roller is a non-rubber metal roller.

9. The recording apparatus according to claim 1, wherein the first intermediate roller is disposed upstream of the junction.

* * * * *